United States Patent [19]
Brown et al.

[11] Patent Number: 5,134,696
[45] Date of Patent: Jul. 28, 1992

[54] VIRTUAL LOOKASIDE FACILITY

[75] Inventors: David D. Brown, Poughkeepsie; Wayne J. Morschhauser, Wappingers Falls; Rick F. Reinheimer, Wappingers Falls; Michael D. Swanson, Poughkeepsie, all of N.Y.

[73] Assignee: International Business Machines Corp., Armonk, N.Y.

[21] Appl. No.: 225,445

[22] Filed: Jul. 28, 1988

[51] Int. Cl.⁵ .................. G06F 12/10; G06F 12/12
[52] U.S. Cl. ............................. 395/425; 395/700; 364/DIG. 1; 364/243; 364/243.4; 364/246.1; 364/246.11; 364/246.12; 364/256.3; 364/256.4
[58] Field of Search ... 364/200 MS File, 900 MS File, 364/200, 900; 395/425, 700, 600

[56] References Cited

U.S. PATENT DOCUMENTS

| | | | |
|---|---|---|---|
| 4,355,355 | 10/1982 | Butwellet | 364/200 |
| 4,521,846 | 6/1985 | Scalzi et al. | 364/200 |
| 4,612,612 | 9/1986 | Woffinden et al. | 364/200 |
| 4,943,913 | 7/1990 | Clark | 395/700 |
| 4,945,480 | 7/1990 | Clark et al. | 395/700 |
| 5,008,811 | 4/1991 | Scalzi et al. | 395/400 |
| 5,023,773 | 6/1991 | Baum et al. | 395/425 |

OTHER PUBLICATIONS

Gio Wiederhold, "Database Design," McGraw-Hill, 1983, pp. 555-575.
H. Lorin and H. M. Deitel, "Operating Systems," Addison-Wesley Publishing Co., 1981, Chapter 14.
MVS/Extended Architecture Supervisor Services and Macro Instructions-GC28-1154-3 (Jun. 1987).
MVS/Extended Architecture JCL Reference GC28-1352-3 (Jun. 1987).
MVS/Extended Architecture Data Administration Guide-GC26-4013-2 (Jan. 1987).
MVS/Extended Architecture Data Administration: Macro Instruction Reference-GC26-4014-2 (Jan. 1987).
IBM System/370 Extended Architecture-Principles of Operation-SA22-7085-1 (Jan. 1987).
MVS/Extended Architecture System Programming Library: System Modifications-GC28-1152-2 (Mar. 1987).
MVS/Extended Architecture System Programming Library: GC28-1194-4 (Mar. 1987).

*Primary Examiner*—Gareth D. Shaw
*Assistant Examiner*—Paul Kulik
*Attorney, Agent, or Firm*—William B. Porter

[57] ABSTRACT

A virtual lookaside facility is provided for maintaining named data objects in class-related data spaces in virtual storage, readily retrievable by user programs. A search order is associated with each user, specifying an ordered list of "major names" which are, in effect, sequentially searched for a specified "minor name", or data object, to obtain a virtual storage copy of that data object. As data objects are placed into a virtual cache, existence information, implicit in the naming structure, is captured and saved. This information is relied on later in retrieving objects from the cache. The data isolation provided by maintaining class data and control blocks in individual data spaces is exploited to prevent failures relating to one class of objects from affecting the others, and to handle latent program users, following failures, effectively.

An LRU-like trimming technique is used to remove less useful objects from the cache when cache space is fully utilized.

9 Claims, 12 Drawing Sheets

FIG.2    OBJECT NAMING STRUCTURE

FIG. 4  OBJECT INVALIDATION INFORMATION

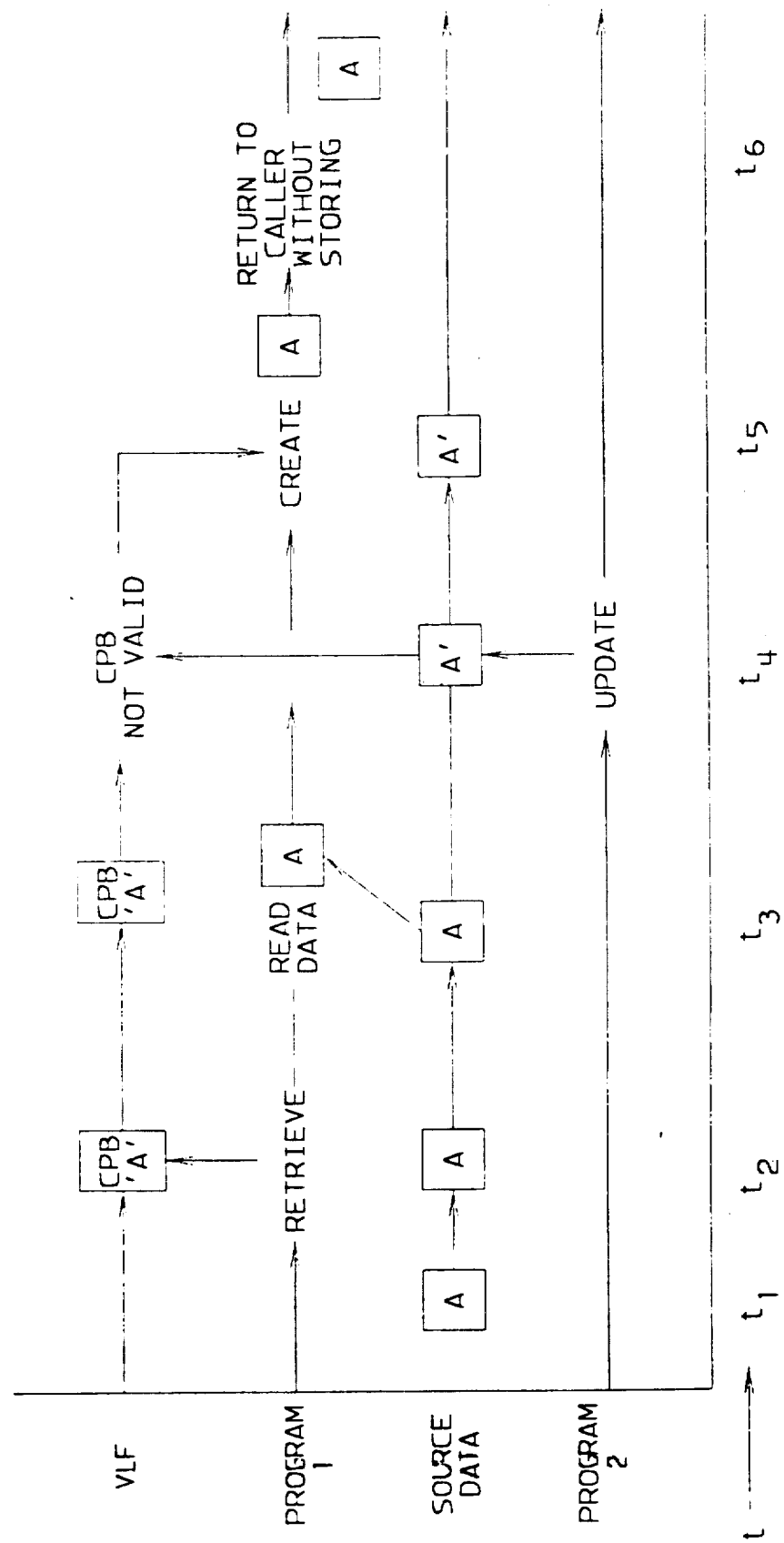

VIRTUAL LOOKASIDE FACILITY

CROSS REFERENCE TO RELATED APPLICATIONS

This application contains subject matter which is related to the subject matter of the following applications filed on Feb. 10, 1988 and assigned to the same assignee: "Control Mechanism for Zero-Origin Data Spaces", by C. A. Scalzi, et al., (Ser. No. 154,688), now U.S. Pat. No. 5,008,811; "Linkage Mechanism for Program Isolation", by R. I. Baum, et al., (Ser. No. 154,733); "Home Space Facility" by C. E. Clark, (Ser. No. 154,780), now U.S. Pat. No. 4,943,913; "Access Register Translation Means for Address Generating Mechanism for Multiple Virtual Spaces", by R. I. Baum, et al., (Ser. No. 154,689); "Nonhierarchical Program Authorization Mechanism", by R. I. Baum, et al., (Ser. No. 154,740), now U.S. Pat. No. 5,023,773, and "Domain Related Access Lists", by C. E. Clark, et al., (Ser. No. 154,685), now U.S. Pat. No. 4,945,480. These co-pending applications are incorporated by reference herein. Also referenced herein is U.S. Pat. No. 4,355,355 entitled "Address Generating Mechanism for Multiple Virtual Spaces" to J. R. Butwell, et al., and U.S. Pat. No. 4,521,846 entitled "Mechanism for Accessing Multiple Virtual Address Spaces" to C. A. Scalzi et al., both also assigned to the assignee of the present application.

FIELD OF THE INVENTION

This invention relates to the field of systems control programming. More specifically, it relates to systems and methods for improving the speed of access of named data objects by means of virtual storage caching techniques, and to recovery techniques for transactions using such cached data objects.

DESCRIPTION OF THE PRIOR ART

There are a number of software services which process elements residing on DASD. The overhead to load an element from DASD and manipulate the element into a usable format for every user request can be costly in terms of CPU time and I/O processing. Much of the overhead can be eliminated if, once loaded and reformatted, the object is saved and shared among users.

Many existing services utilize partitioned data sets to contain elements. These data sets have a naming structure similar to that disclosed in this invention. Similarly, caching objects in virtual storage is not new (see, e.g., the Virtual Fetch facility of MVS/XA described in System Modifications, GC28-1152). However, features of this invention that are not found in the prior art include:

1. Automatic invalidation of cache objects when associated partitioned data set members are modified on DASD.
2. Quick determination of whether a cached object is the "best match" for a user (i.e., occurs earliest in the user's search sequence).
3. Storage of cached objects and control blocks in Data Spaces—with concomitant isolation and storage availability benefits, as well as recoverability advantages.
4. Sharing cached objects among different users, each with a potentially unique search sequence.

SUMMARY OF THE INVENTION

The present invention is a system and process for storing, maintaining, and retrieving named data objects in virtual storage. It encompasses a control structure designed to capture information about the location of data within a tree structure that is implicit in a commonly used naming technique when transactions perform routine caching operations, and allows subsequent transactions to gain performance benefits by selective usage of this information. It also provides unique mechanisms for ensuring that back-level information is not inadvertently obtained from or stored into the cache, and a means of exploiting Data Spaces for enhanced recoverability of cached data.

It is an object of the present invention to provide a mechanism and process for concurrently creating, retrieving, and deleting data objects by multiple users executing in different address spaces, with high performance.

It is a further object of this invention to achieve the benefits of high capacity, storage isolation by class, and good recovery and integrity characteristics, through the usage of data spaces for data objects and object control information.

BRIEF DESCRIPTION OF THE DRAWINGS

FIG. 7 is a linear flow diagram showing the synchronization mechanism used by VLF when one program attempts to create a VLF object being updated by a second program.

FIG. 8 is another linear flow diagram showing another instance of the synchronization mechanism.

DESCRIPTION OF THE PREFERRED EMBODIMENT

Figure 1:
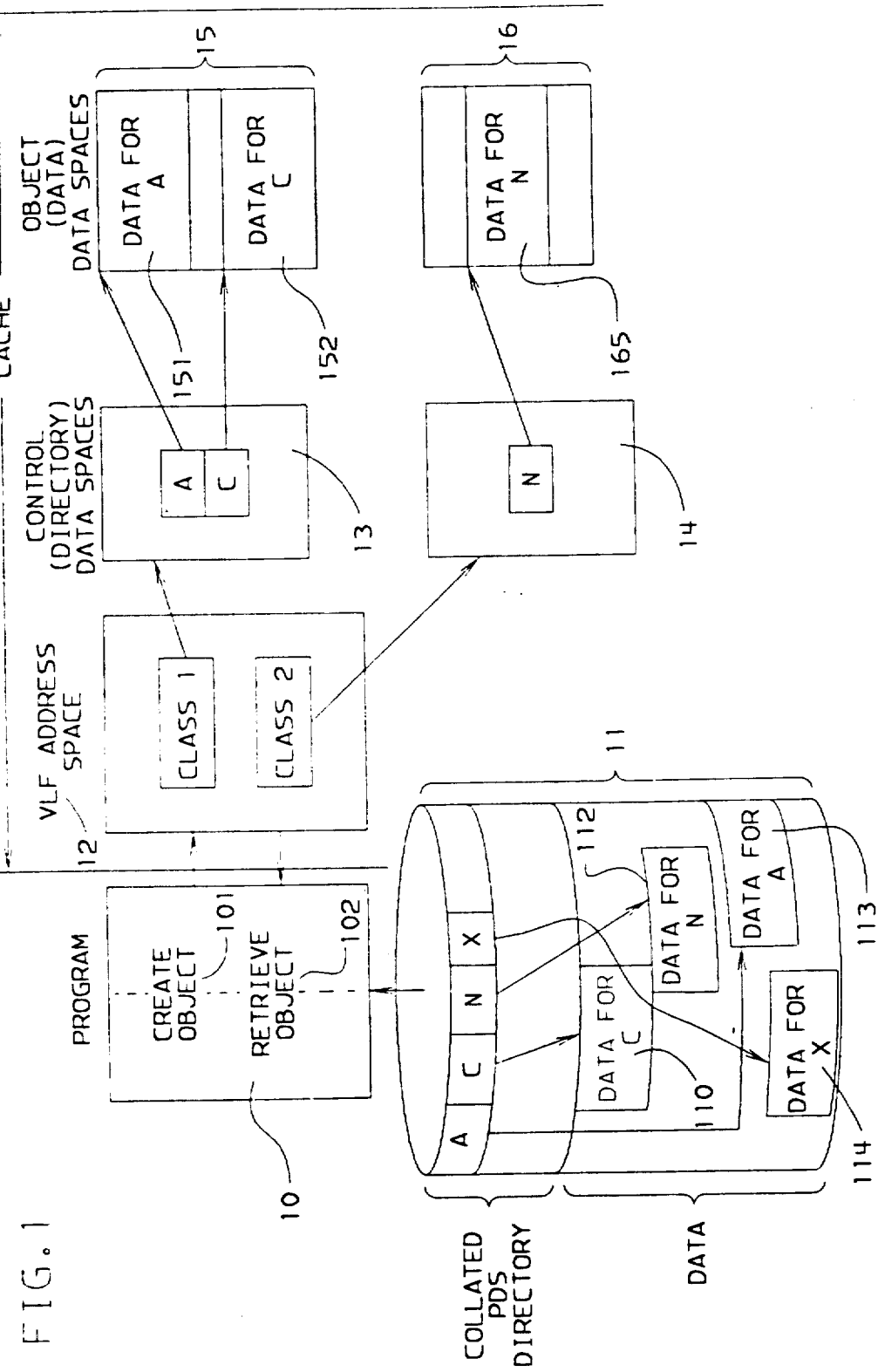
FIG. 1 is a block diagram indicating the relationship between the Virtual Lookaside Facility (VLF) user program, the source data on DASD, and the related address spaces and data spaces.

FIG. 1 illustrates a high-level view of the virtual lookaside facility (VLF). VLF uses data spaces to contain information about the classes of data objects it stores. (Data Spaces are described more fully in the aforementioned application entitled "Control Mechanism for Zero-Origin Data Spaces").

Figure 9A:
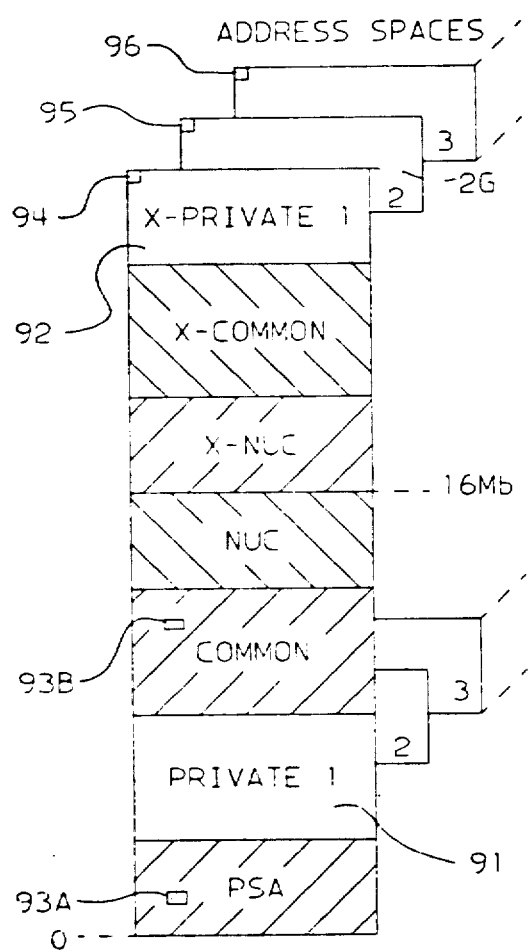
FIG. 9A is a schematic diagram of an MVS/XA address space.

FIG. 9A illustrates the structure of a typical MVS/XA program address space. The shaded areas are "common" to all program address spaces—there is only one logical version of these common areas, so that a change made to a common area of storage is immediately reflected in all program address spaces, since all share the same common storage. Data which is placed into a program address space, which is to be isolated from other programs, must be placed into one of the private areas (91, 92).

Figure 9B:
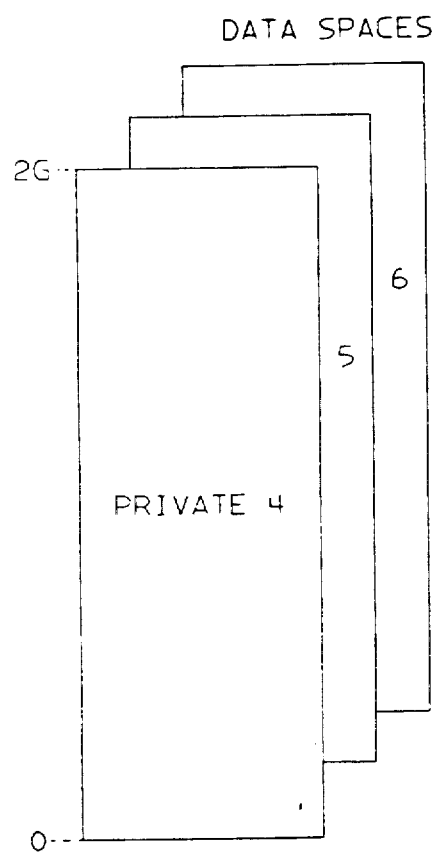
FIG. 9B is a schematic diagram of an MVS data space.
Figure 10:
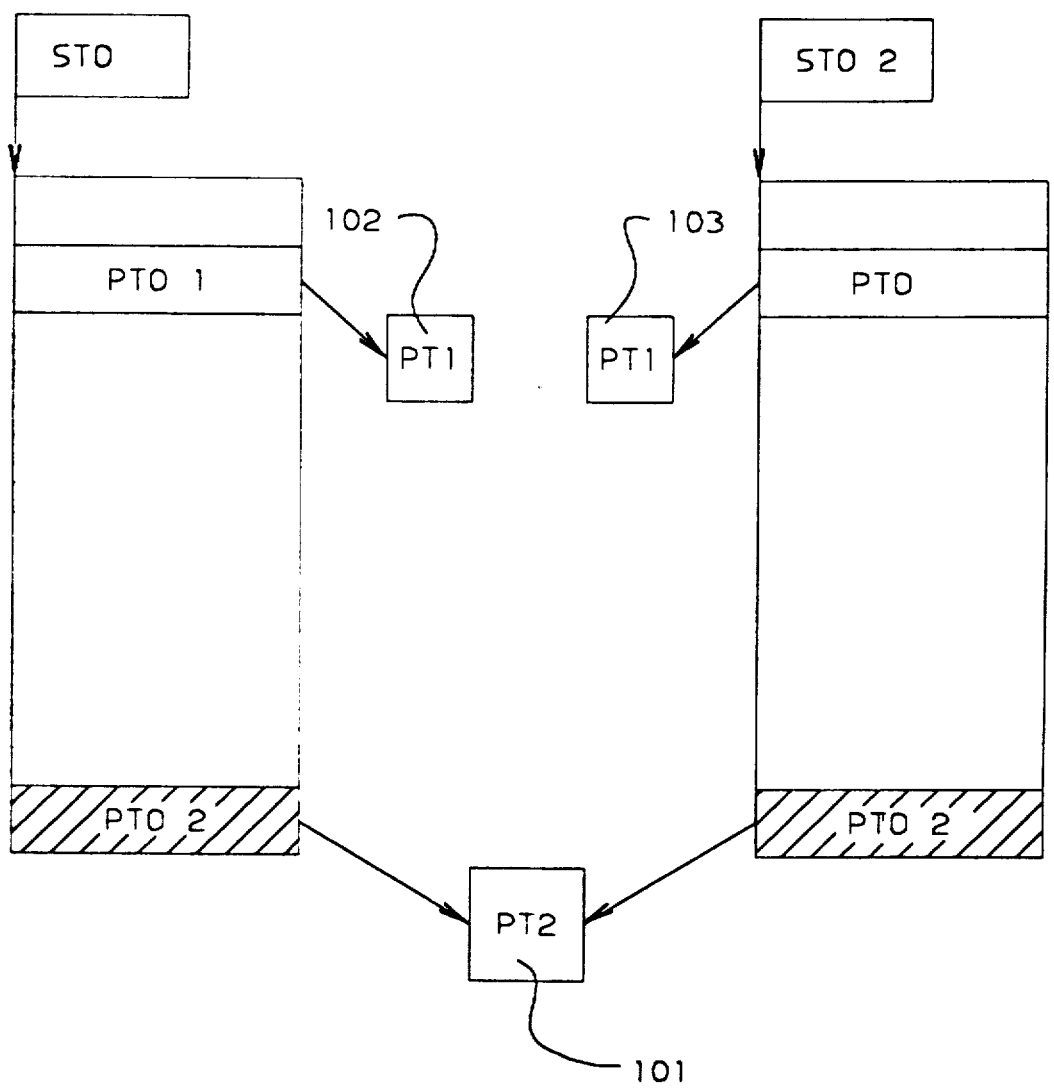
FIG. 10 is a schematic diagram illustrating the mapping of segments to page tables.

FIG. 9B illustrates the "data space" used in the present invention. It is distinguished from a program address space by an indicator bit in an associated segment table descriptor. The absence of shaded areas in FIG. 9B indicates that no areas of such a data space are common either to other data spaces, or to any program address space. To illustrate, a virtual address referring to a storage element within common storage in a program space (93A and 93B) denotes an element whose content is the same viewed from any program space; therefore virtual addresses for all storage within common segments within program spaces are resolved to the same set of page tables (101, FIG. 10). On the other hand, a virtual address referring to a storage element in private storage 94, 95, 96 is resolved to a unique page table 102, 103.

The process of resolving a virtual address into a corresponding real (main storage) address (where the virtual address represents an element that currently resides in real storage) is called dynamic address translation (DAT), and is well known in the prior art (see, e.g., IBM System/370 Extended Architecture Principles of Operation, Publication No. SA22-7085).

Figure 11:
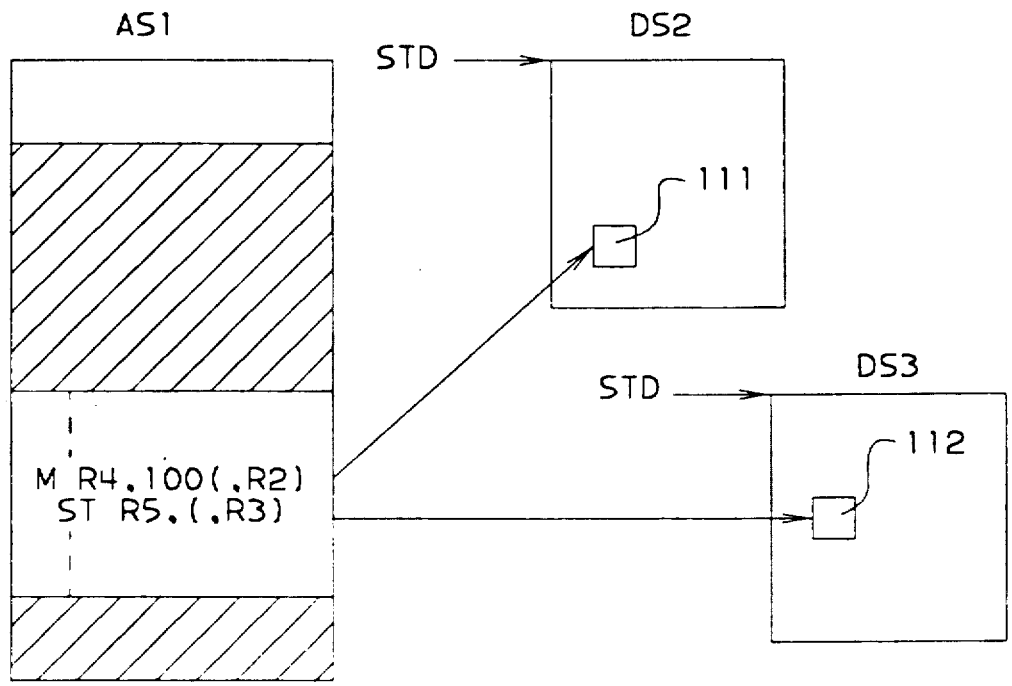
FIG. 11 is a schematic diagram illustrating the use of two data spaces by a program executing in an address space.

An example embodiment, FIG. 11, is a program executing in an address space which multiplies one operand, contained in data space 2 (111) by a second operand, contained in a register, and stores the result in data space 3 (112).

Figure 12:
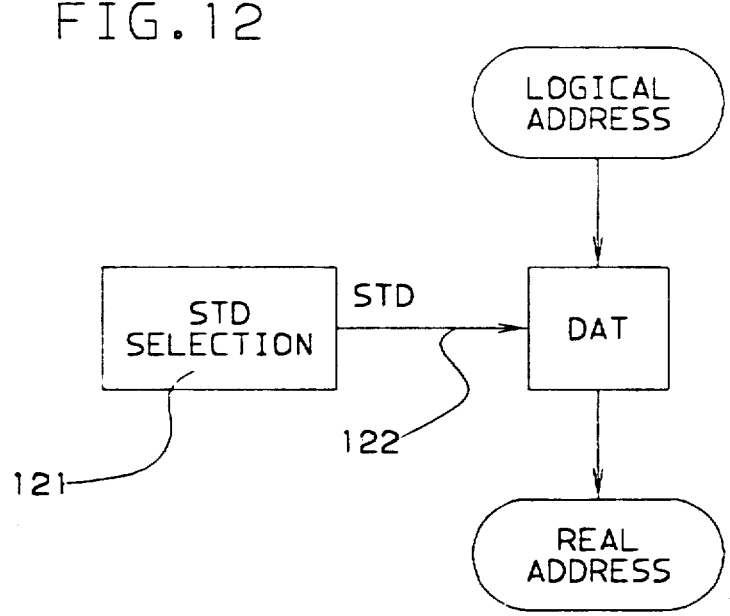
FIG. 12 is a block diagram showing the interrelationship of the STD selection mechanism and the process of dynamic address translation (DAT).

In order to accomplish this series of operations, a mechanism must be provided to associate the logical address of the second operand (contained in register 2 in the example of the multiply instruction shown in FIG. 11) with data space 2, and the logical address of the second operand of the store instruction (contained in register 3 in the example shown in FIG. 11) with data space 3. Graphically, the mechanism for performing this association is designated as "STD selection" 121 in FIG. 12, to indicate that the mechanism must produce a segment table descriptor (STD) associated with the appropriate data space. Many such mechanisms are possible—for example, such a mechanism is provided in the Butwell and Scalzi U.S. patents referenced above (U.S. Pat. Nos. 4,355,355 and 4,521,846) and is assigned to the assignee of the present invention. Another such mechanism is disclosed in the co-pending invention entitled "Access Register Translation Means for Address Generating Mechanism for Multiple Virtual Spaces" by R. I. Baum et al., (Ser. No. 154,689) filed Feb. 10, 1988, and assigned to the same assignee. The segment table descriptor, once produced, is input 122 to the Dynamic Address Translation (DAT) process.

The DAT process ultimately resolves the virtual data space address to a real address. This process is performed for all base-displacement type data references in the instruction being processed and the instruction is executed.

Data kept in data spaces can only be referenced through the DAT facility by means of Access Registers, as described further in the co-pending applications cross-referenced above. Data Spaces have Address Second Table Entries (ASTEs), Segment Table Designators (STDs), Segment and Page tables, just as the well known MVS address spaces do. In fact, the similarities are such that the same overall structure could have been achieved with address spaces.

Figure 13:
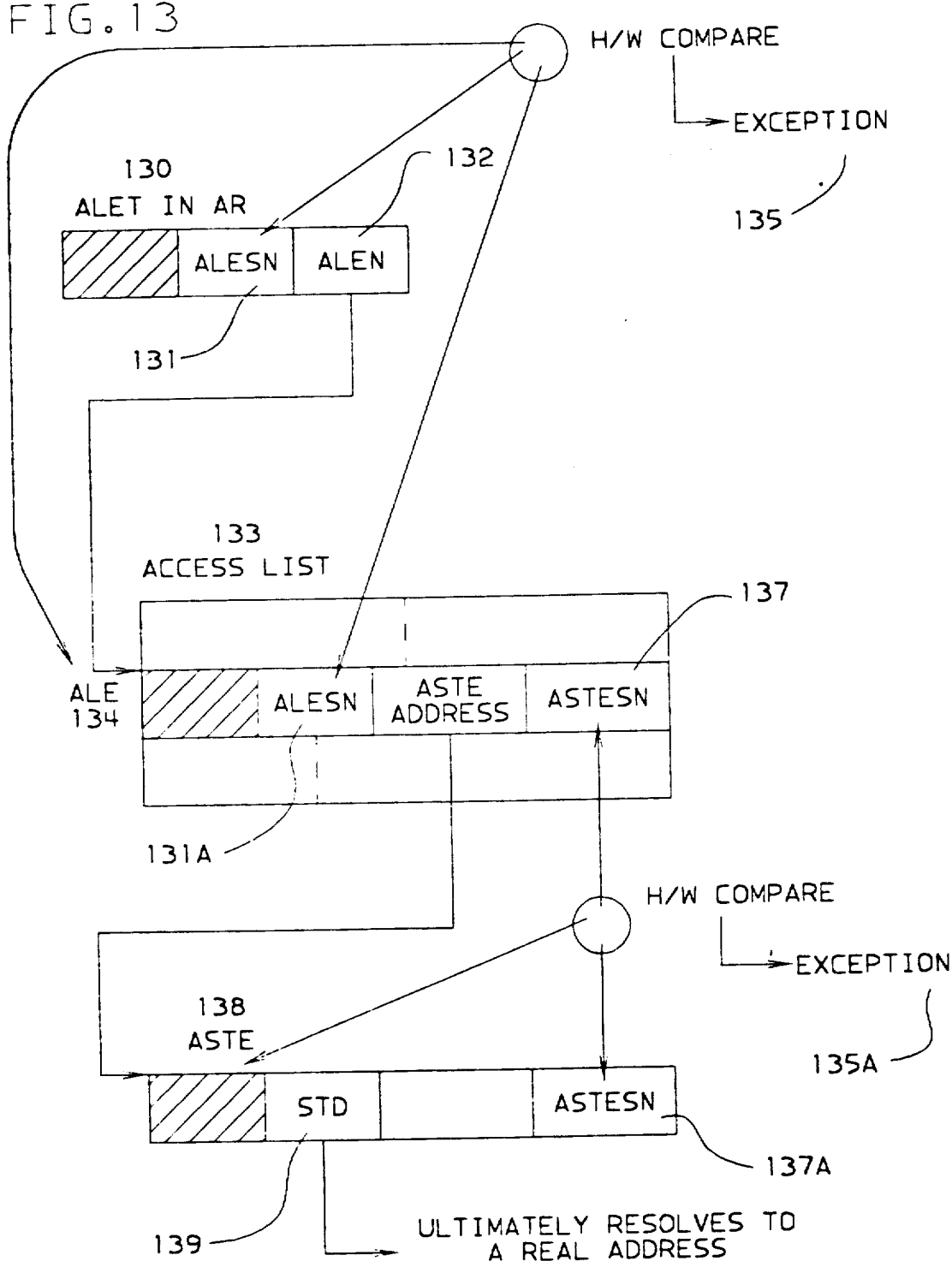
FIG. 13 is a block diagram showing the sequence number comparison mechanism employed in this invention.

After creating a data space, VLF further arranges in software to construct the structures, Access List Entry (ALE) and Access List Entry Token (ALET), necessary for accessing the space via the Access Register Translation (ART) process. FIG. 13 shows the structures and fields relevant to understanding the ART process relative to this invention.

The Access List Entry Token (ALET) (FIG. 13 at 130) is a 32 bit value that, when loaded into an access register, will enable the hardware to select a particular Access List Entry (ALE) 134 in one of two possible access lists for any given work unit. One access list is associated with the work unit and the other is associated with the primary address space. The ALE 134 that was created contains the address of an Address Second Table Entry (ASTE) 138 which in turn contains the Segment Table Descriptor 139 of the data space. When executing an instruction in AR mode, the hardware will look through this chain of control blocks to resolve the virtual address in the general purpose register and associated Access Register containing the ALET into a real address and access the data.

The Access List 133 is, however, a dynamic structure. Software can create and delete data spaces (represented by ASTEs) and add or remove access list entries (ALEs) for them at any time. Thus, the ALET values that programs are using constitute static values being used to reference dynamic entities. In order to assure that an ALET cannot be used to reference spaces other than that with which it is properly associated, several validity checking mechanisms are built into the structures. In addition to basic validity bits that indicate whether an ASTE or an ALE is valid (i.e. in use) or not, there are sequence number fields that are changed when an ASTE is reused or an ALE is reused. When the hardware performs the ART process, it compares the ALE sequence number in the AR 131 with the ALE sequence number 131A in the referenced ALE. If they do not match an ALE-Sequence Exception program interrupt code is generated 135. Similarly, if the ASTE sequence number in the ALE 137 does not match the ASTE sequence number 137A in the ASTE 138 pointed to by the ALE 134 an ASTE-Sequence Exception program interrupt code is generated 135A. If the ASTE pointed to by the ALE is not a valid ASTE (invalid indicator off) an ASTE validity exception program interruption code is generated 135A. Finally, if the ALE located via the ALEN 132 portion of the ALET in the AR does not locate a valid entry (invalid indicator off), an ALEN-Translation exception program interrupt code is generated 135.

ASTE sequence numbers are used primarily when the space represented by the ASTE is an address space, since for address spaces an ASTE actually represents a fixed location entry in the Address Second Table (AST). For data spaces, ASTEs are free-standing and not actually part of a fixed table; thus the ASTE sequence number for data spaces never changes.

ALE sequence numbers are changed each time a particular ALE is reused. That is, when an ALE is assigned to represent a particular space by pointing it to the ASTE for that space, its sequence number is updated prior to marking the entry as valid.

As part of the ALE invalidation process, an instruction is issued to the hardware to assure that it will invalidate any subsequent references to this ALE on the current processor or any other processor in a multi-processor configuration that would otherwise occur due to using any possible hardware lookaside information that would bypass the ALE reference. This process is directly analogous to the well known SYS/370 PTLB (Purge Translation Lookaside Buffer) instruction relating to Dynamic Address Translation (DAT) (see publication SA22-7085 for background).

For each class of VLF objects there are two associated data spaces: the first data space is the Control Data Space (13, 14) which contains the names and locations of objects stored for a particular class (see below); the second data space is the Object Data Space, which contains the data objects. Partitioned data set members A (113), C (110) and N (112) exist both on DASD 11, and in the VLF cache 151, 152, 165. Non-cached object (member) X (114) exists only on DASD 11. Objects are placed into the cache by a CREATE OBJECT function 101 and are obtained from the cache by the RETRIEVE OBJECT function 102.

Figure 2:
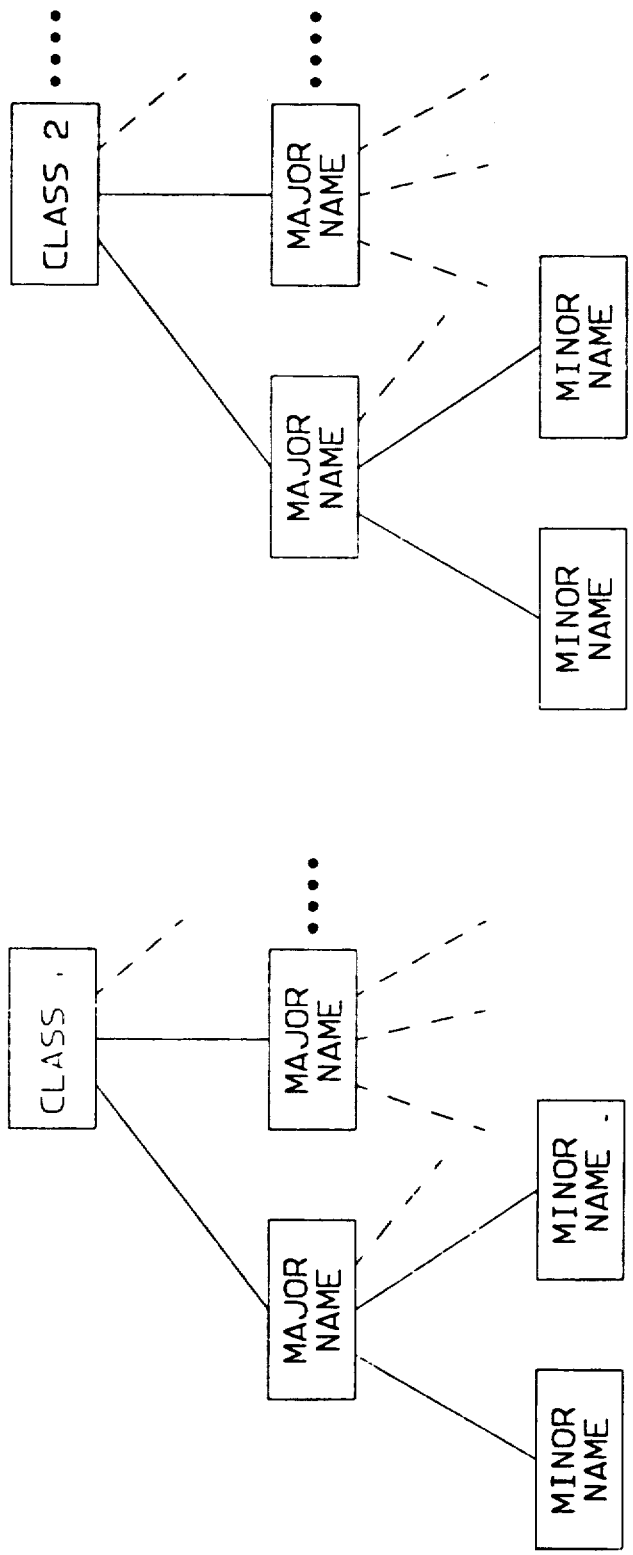
FIG. 2 is a block diagram depicting the object naming structure of the preferred embodiment.

Access to objects is controlled through a three level naming scheme. Any object is uniquely identified by a class name, major name, and minor name. A minor name must be unique within a major name, but is not necessarily unique across all major names in a class. A major name must be unique within a class, but is not necessarily unique across classes. Class names must be unique. FIG. 2 illustrates this structure.

Figure 3:
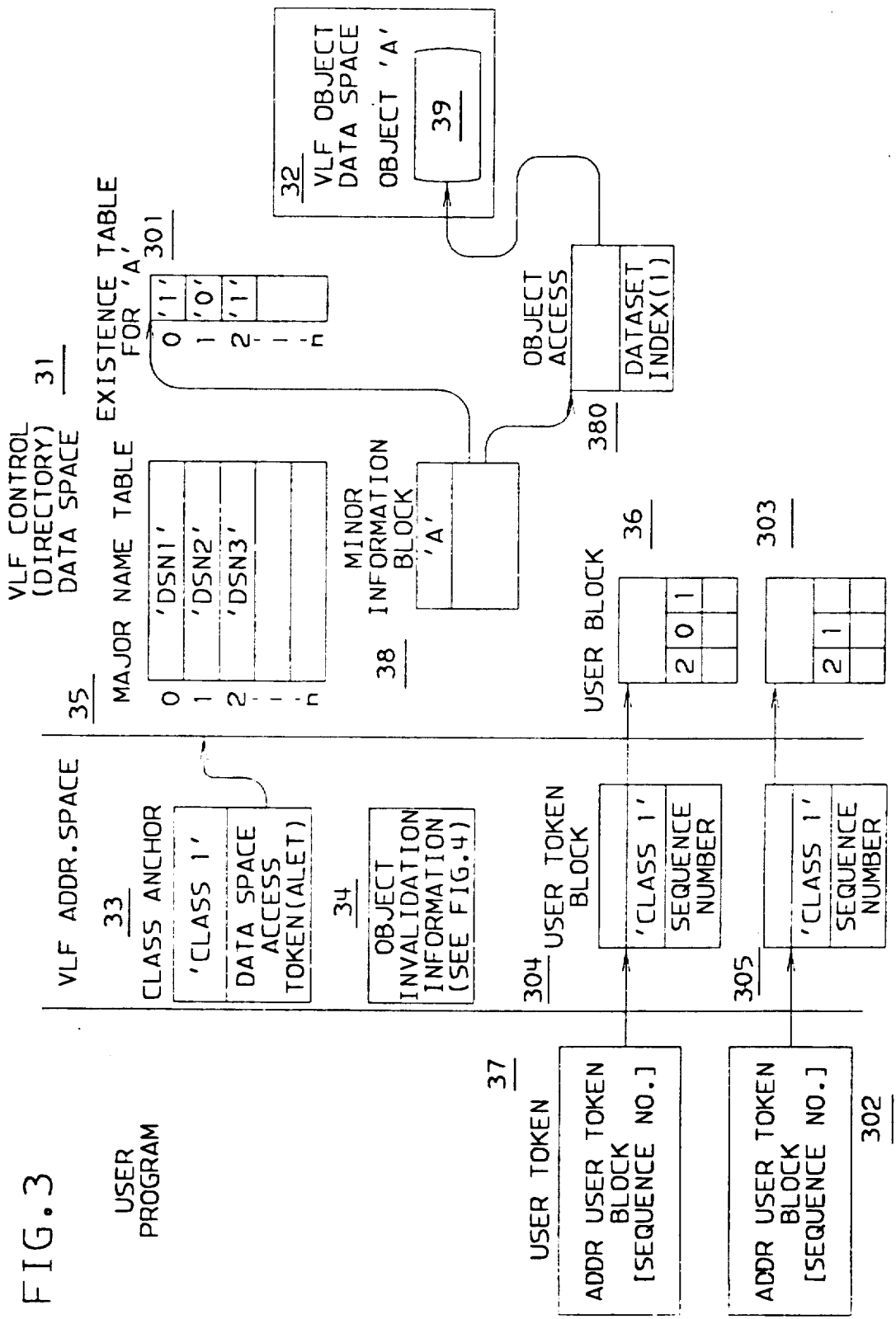
FIG. 3 is a block diagram indicating key control information and relationships in the user program, the VLF address space, the VLF control (directory) data space, and the VLF object data space.

Each user has associated with it an ordered search sequence of major names within a class. When searching for a specific minor name, major names are searched in this sequence. This sequence is saved for each connected user in an associated "User Block", as illustrated in FIG. 3 at 36 and 303. The search sequence is supplied to the IDENTIFY user function either: (1) as an explicit list of major names for classes of objects whose source does not relate to PDS members, or (2) as an implicit list of major names corresponding to a PDS concatenation identified by a DDNAME. In FIG. 3, the associated search sequence for the first user 37 within class 1 is (1) 'DSN3', (2) 'DSN1', (3) 'DSN2'. This is indicated by the search order indexes 2, 0, 1 within user block 36, which are indexes into major name table 35. The associated search sequence for the second user 302 is (1) 'DSN3', (2) 'DSN2'. This is indicated by the search order indexes 2, 1 within user block 303, which are indexes into major name table 35.

The first occurrence of a minor name in a user's search sequence satisfies the request to retrieve the object associated with that minor name from DASD. If the first occurrence of the requested object is in the second major, it implicitly does not exist in the first. If in the third major, it does not exist in the first or second.

In general, if in the Nth major, the object does not exist in the N−1 preceding majors. The named object management technique described requires that when an object is saved as a particular minor name (create object 101 in FIG. 1), it is also saved as being from, or associated with, a particular major name, with the understanding that the minor (object) does not exist in any major occurring earlier in the user's search sequence than the major name provided. More details on this technique of the prior art is found in MVS/XA Data Administrator's Guide (GC26-4013); MVS/XA Data Administration Macro Instruction Reference (GC26-4014); MVS/XA Supervisor Services and Macros (GC28-1154).

The functions within which the preferred embodiment is defined are:

1. DEFINE CLASS (or DEFINE)—which sets up a new class of objects for the virtual lookaside facility (VLF) to manage.
2. IDENTIFY USER (or IDENTIFY)—which establishes a single user of a particular class of VLF objects and associated major name search order for the user.
3. CREATE OBJECT (or CREATE)—which permits the adding of an object to a particular class of VLF objects.
4. RETRIEVE OBJECT (or RETRIEVE)—which permits the obtaining of a copy of a VLF object by a user.
5. NOTIFY—which provides a service by which a modifier of the source of a VLF object can notify VLF of the fact that a change has occurred.
6. REMOVE USER—which removes access to a particular class of VLF objects for an identified user of VLF.
7. PURGE CLASS—which deletes an entire class of objects previously defined to VLF.

These functions are further explained below. The mechanism used to recover a VLF function with a latent bind to the data spaces for a class being purged is shown also. Additionally, the TRIM function, which purges the VLF cache of "old" data when cache space approaches an installation specified limit, is described, along with the mechanism used to synchronize the creation of a VLF object with simultaneous changes to the DASD source of that object.

DEFINE CLASS

The DEFINE CLASS function initializes the control structure and storage areas needed to manage a new class of objects ('CLASS1'). The DEFINE CLASS creates two data spaces for the new class. The Control Data Space (FIG. 3 at 31) contains control blocks for class-related data and the Object Data Space 32 contains the Data Objects.

Figure 4:
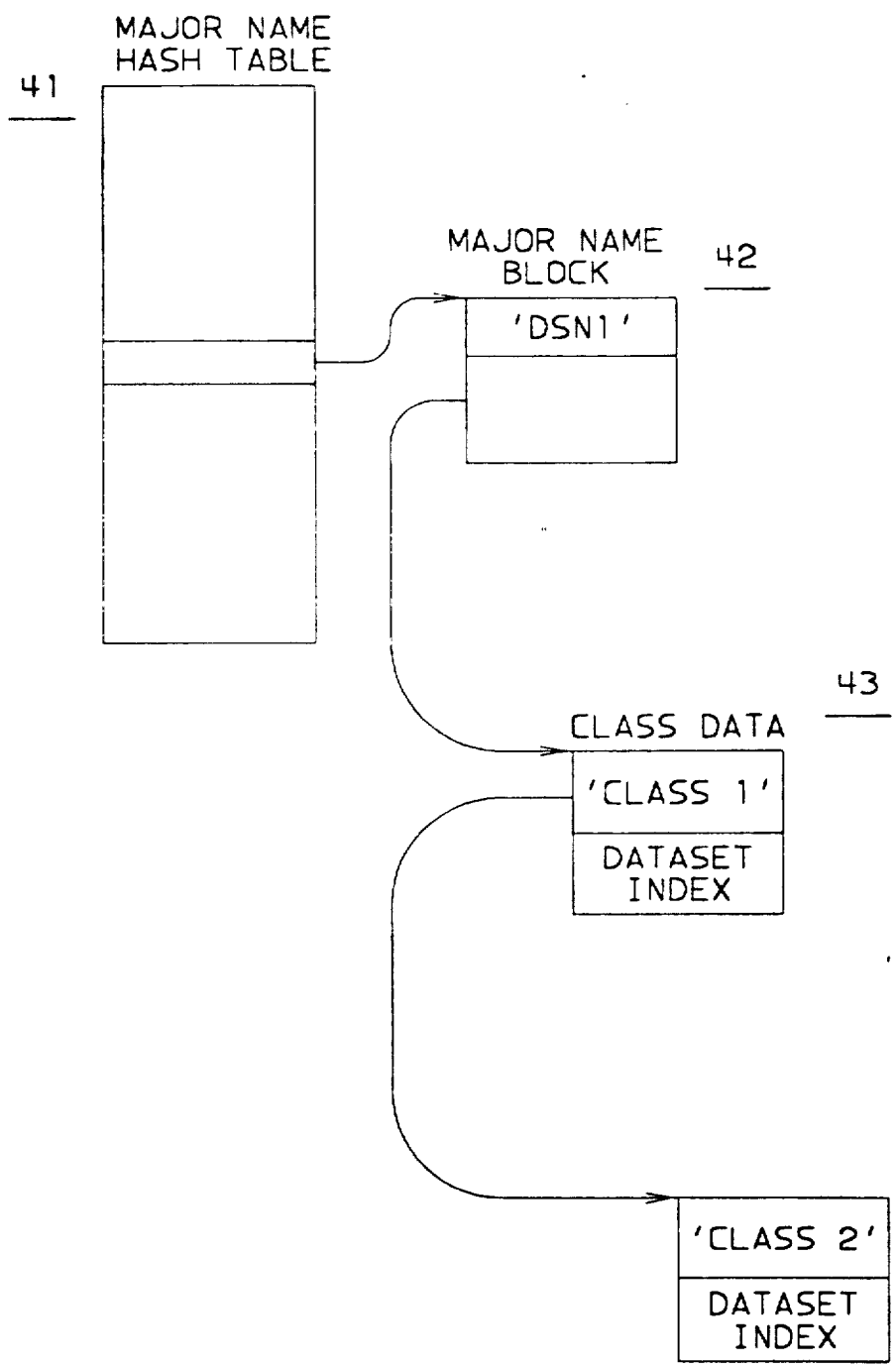
FIG. 4 is a block diagram of key object invalidation information.

The function also initializes the Class Anchor Block 33 and the Object Invalidation Information 34 in the VLF Address Space. The Class Anchor Block contains the class name, an indicator of whether major names for this class relate to PDS members, and unique tokens (and ALETs) which control access to the Control Data Space 31, and Object Data Space 32. The function reads an installation-defined list of Major Names (contained in a SYS.PARMLIB PDS member, which is a well-known PDS, and described in MVS/XA Initialization and Tuning, GC28-1149), which are authorized to be the source of objects that can be stored into VLF and, for each Major Name, creates a Major Name Block (FIG. 4 at 42) and inserts the major name. The function also records the major name in the zero-origin Major Name Table 35, and it creates a Class Data Block (FIG. 4 at 43) to record the index for the Major Name Table entry. This index represents the position of the major name within the Major Name Table 35. The use of the Class Data Block and associated structure shown in FIG. 4 is described later with the NOTIFY function.

IDENTIFY USER

The IDENTIFY USER function establishes a program as a user of VLF functions operating on a particular class of objects. For each major name input to the function which does not already exist in the Major Name Table 35, the function also records that major name in the table 35, and creates a Major Name Block (FIG. 4 at 42) and a Class Data Block (FIG. 4 at 43) to record the index within the Major Name Table 35 for that specific class. A particular search order of Major Names is associated with this instance of IDENTIFY. The Major Name search order is analogous to a DDNAME concatenation (a well known JCL concept explained in MVS/XA JCL Reference, GC28-1352) in that an object with the same Minor Name may exist in more than one Major Name in the search order, and the correct object for this identified program user is the one that is located first when the contents of Major Names are searched in the specified order.

The IDENTIFY function creates a User Block (36) in the VLF Control Data Space 31 to represent this identify and to contain a representation of the specified Major Name search order. The representation of the search order consists of an ordered list of indices into the Major Name Table 35. In FIG. 3, as previously noted, the User Block 36 contains the representation of a search sequence comprised of Major Names 'DSN3', 'DSN1', and 'DSN2'. An index into this ordered list of Major Name Table indices is termed a "search order index".

The IDENTIFY function returns a unique non-zero User Token 37 which indicates the program user and associated search order to other VLF functions. In particular, the User Token allows fast access to the search order information on subsequent invocation of the CREATE and RETRIEVE functions. A User Token (37,302) contains the address of an associated User Token Block (304,305) and the sequence number from the User Token Block (explained with the REMOVE USER function).

CREATE OBJECT

The CREATE OBJECT function allows a program to add an object to a particular class of VLF objects. The program supplies the User Token 37 of a currently identified user of VLF functions, the Minor Name of the object, the object, and the zero-origin search order index. There is no need to specify the class name since the target class was indicated to the IDENTIFY function and is implicitly associated with the User Token 37 via the corresponding User Token Block 304.

Consider the example of a program user currently identified to VLF with the search order 'DSN3', 'DSN1', and 'DSN2' whose search order is represented in the User Block 36. The program wishes to add to 'CLASS1' an object whose Minor Name is 'A' and whose associated Major Name is 'DSN2'. The program issues a CREATE and supplies the User Token 37, the Minor Name 'A', the object data, and search order index of 2 (the zero-origin index for the third dataset of the search order).

The objective of the CREATE function is to ensure that the requested object and the control structure to access it exist in the target class. The structure consists of a Minor Information Block (FIG. 3 at 38), Existence Table 301, and Object Access 380 pointing to the stored object 39; portions of the structure may already exist for this same object or a different object with the same minor name. CREATE must locate or build the Minor Information Block 38 and Existence Table 301 for the minor name and determine whether an Object Access block 380 already exists (relates to the same major name) for the object being created. If an Object Access block 380 does not exist, CREATE makes a copy of the new object 39 in the Object Data Space 32, builds an Object Access block 380 pointing to the new object, and chains the new Object Access block 380 to the end of an existing chain of Object Access blocks or to the Minor Information Block 38 if no Object Access chain exists. In all cases, CREATE updates the Existence Table 301 associated with the Minor Information Block (the nature of the update is described later).

In the example constructed here, the CREATE function constructs a Minor Information Block 38 to represent Minor Name 'A' in 'CLASS1'. It then creates an Object Access 380 block and fills in the Major Name index of 1 obtained by using the search order index of 2 to access the search order in the User Block 36. The Object Data 39 is copied into the Object Data Space 32, the Existence Table 301 is created for Minor Name 'A' and the Existence Information in the table is set.

The Existence Table 301 is a structure of single-bit entries which correspond one-for-one to the Major Name entries in the Major Name Table 35. When a bit is on ('1'B), it indicates that the associated Minor Name does not exist in the corresponding Major Name, a piece of information that is consistent with the rules for searching concatenations or search orders (see BLDL, publication GC26-4014) and is valuable during processing of the RETRIEVE function. When the bit is off ('0'B), it indicates that the Minor Name may exist in the corresponding Major Name. The setting of the bits is determined implicitly from the search order index supplied to the CREATE function, together with the user's search order. In this example, a search order index of 2 implies that the object 'A' does not exist in the Major Names earlier in the search order, namely 'DSN3' and 'DSN1' which have Major Name indexes of 2 and 0 respectively.

RETRIEVE OBJECT

The RETRIEVE OBJECT function allows programs to obtain a copy of an object stored in VLF. The program requesting the RETRIEVE supplies the User Token 37 of a currently identified user of VLF functions, and the Minor Name of a desired object.

Consider the example discussed for the CREATE function where a program identifies itself to 'CLASS1' with the search order 'DSN3', 'DSN1', 'DSN2' and issues the CREATE for an object with Minor Name 'A' from 'DSN2'. Suppose that, sometime after the CREATE, the program issues a RETRIEVE for Minor Name 'A', providing user token 37.

The RETRIEVE function first searches for a Minor Information Block 38 for Minor Name 'A'. If no such block is found, the object does not exist in VLF and the RETRIEVE is finished. When one is found, all the Object Access 380 blocks associated with Minor Name 'A' are searched to determine which Object Access represents the object that would be found first in a search of the Major Names indicated by the search order in the User Block 36. If no such object is found, again the RETRIEVE is finished. In this example, RETRIEVE finds an object 'A' that was created from the third Major Name in the search order, 'DSN2', which has a Major Name Table 35 index of 1. At this point, RETRIEVE has found a VLF object 'A' from the first Major Name in the user's search sequence which contained a VLF object A; but it is not certain whether an object 'A' exists in an earlier Major Name (Major Name indices of 2 or 0) not authorized to be the source for VLF objects.

RETRIEVE uses the existence information in the Existence Table 301 to determine whether a found object is from the absolute earliest Major Name in the search order. Each bit in the table indicates whether or not the Minor Name is 'known not to exist' in the corresponding Major Name. In this example, the existence bits for Major Name indexes 2 and 0 are checked. If both bits are on ('1'B), the object 'A' is 'known not to exist' in both of the earlier search order Major Names; and the object is returned to the requesting program indicating that the object is from the absolute earliest search order Major Name.

When any of the existence bits are off ('0'B), RETRIEVE cannot determine whether or not the Minor Name exists in an earlier search order Major Name. The object is still returned to the requesting program, but the indication is that the object may or may not be from the absolute earliest search order Major Name. Additionally, the search order index is also returned to the requesting program.

The reason for returning the (potentially wrong) object is that there are three operations that can be separated in using a Partitioned Data Set (PDS) object on DASD where a Data Set concatenation is involved. The first operation (BLDL—a well known MVS operation used to search PDS directories) reads the PDS directory of each PDS in the concatenation to determine the earliest PDS which contains the desired object. The second operation then performs the actual access of the data set and reads the object into program storage. A (potential) third operation transforms that object into a format usable by the requesting program. When RETRIEVE indicates that the object returned may or may not be correct, the search order index returned by RETRIEVE can be compared with the search order index determined by the BLDL. If the indexes match, the object returned by RETRIEVE is confirmed to be the earliest in the search order and the overhead of performing the second and (potential) third operations to read the object and convert it to usable format can be bypassed.

The existence information provides additional value to programs other than the program which originally stored the object. The existence information is an aggregation of information saved on all CREATE requests for a Minor Name. The existence information may be used on any specific RETRIEVE request to determine that the object stored in the VLF cache is the absolute earliest search order Major Name or only has the potential of being the earliest.

Again consider the example described for the CREATE function. This time a different program identifies itself to VLF with a search order of 'DSN3' and 'DSN2' as shown in User Block 303, and the program then issues a RETRIEVE for object 'A' and references the User Token associated with User Block 303. RETRIEVE finds the Minor Information Block 38 for 'A' and again determines that the Object Access 380 block earliest in the search order for this second user is from 'DSN2' (Major Name Table index is 1). The existence information 301 is checked for 'DSN3' the only other Major Name in the search order (Major Name Table index is 2) and the existence bit for 'DSN3' is on ('1'B) indicating that there is no object 'A' in 'DSN3'. Therefore, the object 'A' 39 found is indeed the earliest one in this program's search order and RETRIEVE copies the object into the program's storage indicating that it is from the earliest search order Major Name.

The program now uses the object and saves the overhead associated with directory searches, object reads, or translations into usable format. In a system with many programs containing intersecting and/or similar search orders, this savings in external storage accesses can be realized many times over with the additional benefit that contention for the external storage device is proportionally reduced, and the time required to retranslate the object into usable format is similarly reduced.

NOTIFY

In order to maintain the currency of the objects it stores, VLF must be aware of changes made to the source of these objects. When such changes occur, it is the responsibility of the program using VLF to arrange for the area making the change to invalidate a stored copy of the object via the NOTIFY function only after making the change to the source copy. The requestor of the NOTIFY supplies:

- an indicator of the type of change (e.g. Add of a minor to a major, Delete of a minor from a major, Update of the contents of a minor, Delete of an entire major)
- the class to which the NOTIFY pertains
- the minor and/or major name affected by the change.

In an operating system or control program environment where objects correspond to PDS (or PDS-type) data set structures, the operating system component which actually makes the change is modified to invoke the NOTIFY to ensure that the affected objects are invalidated. Because updates can occur to many more objects than are actually stored in VLF, the NOTIFY function uses the Object Invalidation Information (FIG. 4) to limit its search to those active (via DEFINE) classes which are eligible to store object associated with the input Major Name.

Suppose a program needs to delete a object with Minor Name 'A' from Major Name 'DSN2'. NOTIFY uses a hashing algorithm (such algorithms are well known) on the Major Name to determine the appropriate entry in the Major Name Hash Table (FIG. 4 at 41) which points to a synonym chain of Major Name Blocks 42. The synonym chain is searched to determine which Major Name Block references the desired Major Name, 'DSN2'. The Major Name Block references a chain of Class Data Blocks 43, each of which indicates the class that references the Major Name and the Major Name Table (FIG. 3 at 35) index of the Major Name ('DSN2' has an index of 1 in 'CLASS1') in the Control Data Space 31 for the class.

Within the Control Data Space, NOTIFY locates the Minor Information Block 38 for object 'A', finds the Object Access 380 block for the object 'A' related to the Major Name with a Major Name index of 1, invalidates the Object Access and object 'A' 39, and resets the existence bit (index is also 1) to '0'B in the Existence Table 301 for object 'A'. This same scenario applies if the contents of the source object are changed instead of deleted; the stored object must be invalidated.

A slightly different scenario occurs when a new source object is added to a Major Name. Suppose that a source object 'A' is added to a Major Name, 'DSN1'. The object cannot possibly be stored in VLF since the NOTIFY indicates a new source object was created. However, the existence bit (index 0 in this case) in the Existence Table 301 must still be reset to '0'B since prior CREATE functions may have inferred correctly that the object 'A' was 'known not to exist' in 'DSN1', but that information is no longer correct.

REMOVE USER

The REMOVE function removes access to a particular class of VLF objects for an identified user of VLF. It negates the effect of a specific IDENTIFY. When a program is terminating or determines that is should no longer have access to the class of objects, the program invokes the REMOVE function to remove that access.

The User Token 37 that the program received from the IDENTIFY function is passed to the REMOVE function to identify the specific IDENTIFY which should be nullified. REMOVE deletes the User Block 36 and indicates that the user token is no longer valid for any type of access to VLF information. Any subsequent attempt to access VLF with this user token will be rejected.

The method used to make a User Token premanently unusable involves two items related to the creation and use of the User Token Block 304 which resides in the VLF address space and is used to access the User Block 36. First, the VLF address space storage used for User Token Blocks 304 is created in storage pools and managed using MVS Cell Pool services (see MVS/XA publication GC28-1154 for further detail on these services). This ensures that the User Token Block storage is used solely for User Token Blocks while VLF is active. Second, the User Token Block 304 contains a sequence number which starts at 0 and is increased by 1 each time the block is marked not valid when either an explicit REMOVE is issued or the class related to the User Token Block is deleted by a PURGE request. The same sequence number is recorded in the User Token 37 by IDENTIFY so that the User Token is usable only when the User Token Block is valid and the sequence numbers match.

The REMOVE function also cleans up the data structures relative to major name usage. If the user being removed is the last user of a particular major name, the Major Name Table Entry (FIG. 3 at 35) for that major name is made available for reuse and the Class Data Block (FIG. 4 at 43) for that major name is freed up. If the Class Data Block that is freed is the only one chained from the Major Name Block for the major name, the Major Name Block is also freed.

PURGE CLASS

The PURGE CLASS function deletes an entire class of objects that has been defined to VLF. PURGE deletes the Class Anchor Block 33, the Control Data Space 31 for the class, and the Object Data Space 32 for the class. It also deletes Class Data blocks (FIG. 4 at 43) (and, if necessary, the Major Name Blocks 42) associated with Major Names referenced by the class being purged.

RECOVERY FUNCTION

VLF makes use of the hardware checking in its recovery design. When the PURGE CLASS function is used to delete the data spaces for a given class, part of the process is also to invalidate VLF's Access List Entries (ALEs) for these data spaces.

The unique data space access tokens (ALETs) for the data spaces also become unusable when the data spaces are deleted. Latent binds between the data spaces and VLF functions already in progress will fail predictably on any subsequent attempt to access the data space storage with an unusable access token. Module recovery for a VLF function detects the ART failure and returns to the caller indicating that the requested VLF function cannot be performed. This recovery function is further explained below.

When a failure in VLF is interpreted as indicating damage to the control block structure for a class, the class can be purged in its entirety, as soon as the diagnostic dump has been taken, by deleting the data spaces for the class.

A key aspect of the recovery scenario is that as soon as the PURGE CLASS function has completed, a new DEFINE CLASS for the same class of objects may be issued. New requests will all work against the new data spaces for both control blocks and objects. Latent programs which are trying to access the same logical class of object cannot access (and therefore not damage) the new data spaces because all VLF functions load the data space ALETs and control block anchors from the Class Anchor Block (FIG. 3 at 33) only once and thereafter use only a copy maintained in working storage or registers. All VLF services are thus "atomic" insofar as their ability to reference the data spaces related to a given class; they may only reference a single logical version of the data spaces. In effect, the work units (transactions) currently using a local copy of the ALETs and control block anchors to access one logical set of VLF data spaces, possess what amounts to a data sequence number (which is the ALESN of FIG. 13 at 131) that restricts these transactions to operating only on the data spaces associated with the same sequence number (the ALESN of FIG. 13 at 131A). The hardware checks that determine the validity of the ALET used to access the spaces assure that latent work units will fail with predictable program checks when they try to reference the deleted data spaces. The VLF recovery code for its functions will detect these program checks and provide unsuccessful return codes to the requestors of the service in an orderly fashion.

Figure 5:
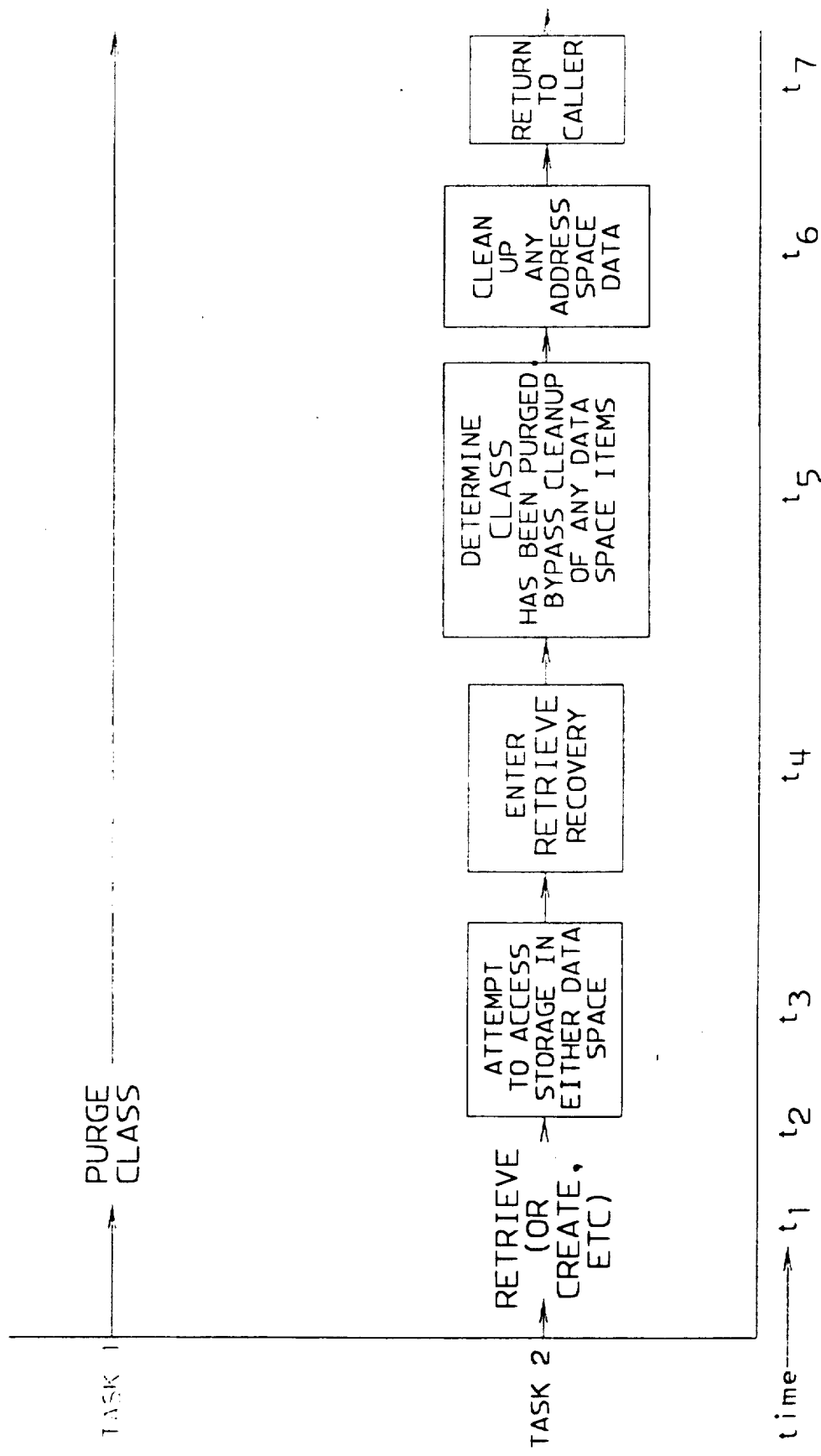
FIG. 5 is a linear flow diagram indicating the relationships between actions in two separate tasks during a particular recovery scenario.

FIG. 5 depicts the sequence of events related to the recovery of a VLF function with a latent bind to the data spaces for a class being purged.

The figure shows two tasks, Task1 and Task2, executing concurrently. At time t1, Task2 requests a VLF function that requires access to the data spaces for a class (e.g., RETRIEVE, CREATE, NOTIFY, ... ). As part of its processing, the VLF function verifies that the class is active and copies the data space access token (the ALET) from the Class Anchor Block (FIG. 3 at 33) into working storage or registers to access data space storage. From this point on, the VLF function uses this working copy exclusively.

At time t2, Task1 issues the PURGE CLASS function for the same class being accessed by Task2. All data space access tokens for the class become unusable as a result of the PURGE.

After the access tokens (ALETs) become unusable, Task2 attempts to reference a piece of data in the class data spaces (time t3), the system detects this and system recovery mechanisms cause VLF recovery for the function to gain control (time t4). The recovery routine checks the validity of the data space access token (time t5) without actually referencing data space storage (referencing data space storage would cause a second failure). When the recovery routine determines that the data space access token (ALET) is not usable, it bypasses any clean-up of partially built data space structures and proceeds to clean up any partially built structures in the VLF Address Space such as Major Name Blocks (FIG. 4 at 42) or Class Data 43 blocks (t6). When the recovery routine completes, it restarts the mainline function (t7) at the point which returns to the caller indicating that the requested VLF function cannot be performed because the class is not defined.

TRIM FUNCTION

VLF allows installations to specify via MAXVIRT parameters in its PARMLIB member, the maximum amount of virtual storage the installation wishes to devote to caching the data objects for a given VLF class. Larger values of MAXVIRT will allow less frequently referenced objects to remain in the VLF cache. The maximum size value and the amount currently in use are both stored in the class anchor block (FIG. 3 at 33) for each class.

The VLF trim task is an asynchronous process which deletes least recently referenced VLF objects from the object data space either when the usage of the object data space storage approaches the installation specified limit, or when a CREATE OBJECT request could not be completed because of insufficient object data space storage to hold the object.

The trim task uses several pieces of information to determine which objects to delete. Each Object Access Block (FIG. 3 at 380) contains the time of the last retrieve for the object (or initially the time of the create). The Class Anchor Block 33 contains the timestamp of the oldest object in the class (initially the time of class definition, it is updated by TRIM when processing the objects contained in the class).

Figure 6:
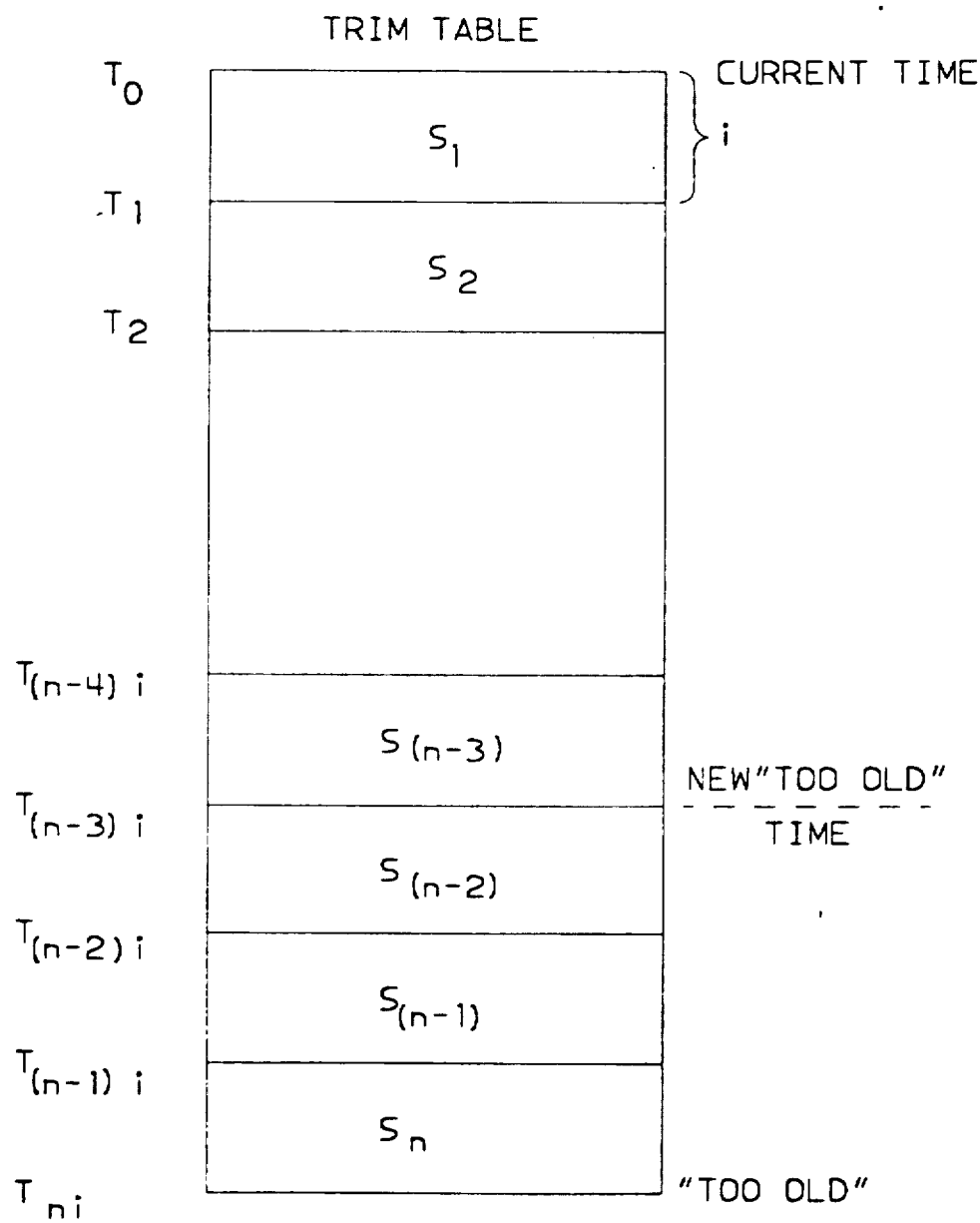
FIG. 6 is a diagram of the Trim Table used by the TRIM function.
Figure 6:
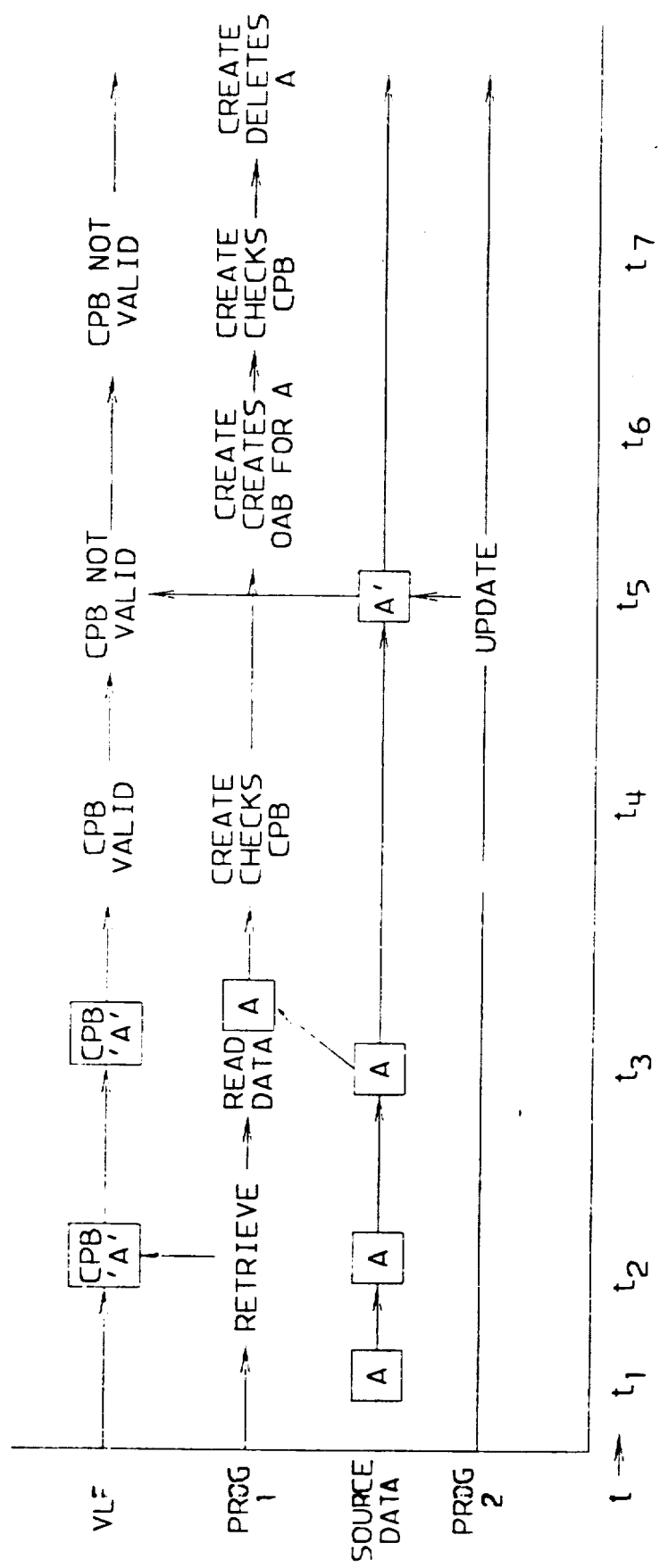

When activated, VLF TRIM examines each Class Anchor Block 33 to determine which classes need trimming. For each class requiring additional object space, VLF TRIM determines how much object data space storage is needed and calculates the time when objects are considered too old so that space for objects with an older retrieve time are reclaimed. The "too old" time is determined by raising the "oldest object" time by a set percentage of the difference to the current time. VLF TRIM looks through the Object Access Blocks and releases the "not-recently-referenced" objects until the desired amount of available object space is reached. If VLF TRIM completes processing of all Object Access Blocks and still has not reclaimed sufficient storage, then a second pass is made using a special trim table (see FIG. 6) which nearly guarantees that the trim process can complete in two passes.

The trim table is constructed on the first pass through the pool of Object Access Blocks to represent all objects remaining in the object data space. Indices into the table subdivide the time between the current time To and the calculated "too old" time Tni, and each entry is a counter of object space for all objects whose retrieval timestamp value is within the given time segment. For example, where i is some time increment and Tni is the "oldest object" time, then the final table entry contains the size (Sn) of all objects with timestamps between Tni and T(n−1)i. For every object not deleted on the first pass, VLF TRIM adds the size of the object to the entry in the table which bounds the object's timestamp. Thus, at the end of the first pass the trim table contains the amount of object space represented by each time segment. A new "too old" time is then calculated by adding the available space in successive oldest segments until the desired amount of available object space is reached. If in FIG. 6

$$\text{Total storage to reclaim} = \text{Total reclaimed} + Sn + S(n-1) + S(n-2)$$

then the new "too old" time for the second pass would be T(n−3)i or stated another way, the previous "too old" time −3i.

SYNCHRONIZATION

The ability to have multiple programs running concurrently on a system introduces additional considerations (outside the scope of the NOTIFY function) which VLF addresses to ensure that the data stored in VLF correctly relates to the source data at any time. FIGS. 7 and 8 illustrate the solution used by VLF to ensure that the data stored in VLF matches the source of that data.

VLF solves this problem of down-level data by requiring that programs intending to create an object issue a RETRIEVE for the object prior to reading the source data. This is reasonable since VLF may already contain the desired data and the program should request the data from VLF before arbitrarily deciding to read the data from source. When the RETRIEVE is issued for an object, VLF assigns a Create Pending Block (CPB) in VLF storage containing the minor name for the object to record that the program will potentially store the object in VLF. A CREATE request checks the Create Pending Block to ensure that the minor was not invalidated by a NOTIFY between the RETRIEVE request and the time that the object is created.

VLF maintains a small fixed size array of Create Pending Blocks (CPBs) for each class and allows only one outstanding pending create for a given minor in the class at any time. If two work units are racing to create an object with the same minor, the first one will obtain a CPB and win the race; the second work unit will not obtain a CPB and its subsequent CREATE will not result in the creation of any object. At startup time, when the lookaside is relatively empty and multiple work units are more likely to be in the create pending situation, this rule helps to prevent wasteful duplicate work and maintain the availability of create Pending Blocks. If a work unit is in a pending create situation, but all the CPBs for the class are in use, the work unit is not assigned a CPB unless one of the "in use" CPBs has been assigned longer than a threshold time, in which case the CPB is reassigned to the new use.

A fixed size array is used so that simple compare and swap serialization can be used for CPB processing. The array size is kept small to keep the time spent locating CPBs by RETRIEVE and NOTIFY to a predictable minimum. By allowing CPBs which are not freed up by CREATEs to become available after a time threshold, there is no need to track which work units are in the create pending state and the need to perform CPB resource cleanup at job step task termination is avoided.

FIG. 7 shows the synchronization achieved. The source data contains A at time t1. At time t2, Program1 issues a RETRIEVE which does not find the requested object and builds a Create Pending Block to contain the name of the object. Program1 then reads the source data for the object (time t3). At time t4, Program2 changes the source data from A to A' and either Program2 or the operating system uses the NOTIFY function to inform VLF of the change in data. The NOTIFY function does not find an object to delete, but it does find the Create Pending Block for the object and marks the block not valid. Program1 then attempts to create the object (time t5), CREATE does not find a valid Create Pending Block for the object, and CREATE returns to Program1 without storing the object.

In this way, use of the Create Pending Block coupled with the protocol requiring a RETRIEVE before reading the source and doing a CREATE prevents a program from inadvertently storing an object into VLF that does not match the current contents of the source data.

In order for this method to guarantee that down-level objects are not created, the CREATE service must perform the following three steps:
1. Check that there is a valid CPB for the MINOR name.
2. Create the Object Access Block (OAB) (or Minor Information Block (MIB) and OAB) for the MINOR name.
3. Check that there is STILL a valid CPB for the Minor name.

Referring to FIG. 8, the trailing CPB check is necessary in order to catch a NOTIFY that occurs between the time (t4) the CREATE service first checks for a valid CPB and the time (t6) the OAB (or MIB and OAB) for the object A is created. At time t4, the CREATE routine first checks for and finds a valid CPB. Program 1 now creates the OAB for the object A (which is down-level) (t6). At time t7, CREATE performs a trailing check to insure there is till a valid CPB for object A. Since it has been marked invalid at time t5, the CREATE routine deletes the down-level object and CPB from VLF.

If the update of the object occurs at any time following t6, the NOTIFY will invalidate the OAB for the object. Thus, by performing both a leading and trailing check of the CPB, there is no point in time when the update will fail to result in the removal of the down-level object.

The fact that a down-level object may exist for a brief moment is of no consequence, since a RETRIEVE operation is asynchronous to the update process and can never be sure which version it will get. The same may be said for a direct read of the source object which is asynchronous to the update process.

We claim:

1. In a central electronic complex comprising system resources, user programs, and an operating system for managing said system resources, a virtual lookaside facility comprising:

A) storage means comprising main and auxiliary storage;

B) a virtual storage cache for storing data objects in said storage means, each data object being linked to a data object control structure and having a minor name uniquely identifying said data object within a data set containing said data object, said data set having a major name uniquely identifying said data set within a class of data objects, said class of data objects having a class name uniquely identifying said class of data objects within said central electronic complex, so that a particular data object is uniquely identified within said central electronic complex by a particular minor name, a particular major name, and a particular class name;

C) one or more search order definition means, each one linked to an associated one of said user programs, for uniquely specifying for said associated one of said user programs, a data set search order, comprising an ordered list of entries, each entry specifying the major name identifying an associated data set, said ordered list indicating the data set search order for a searched-for data object having a searched-for minor name;

D) CREATE means, responsive to a CREATE request by a storing one of said user programs, for storing a stored data object in said virtual storage cache, said storing one of said user programs specifying in said CREATE request a search order index into the data set search order linked to said storing one of said user programs, said search order index indicating the associated data set from which said stored data object was obtained by said storing one of said user programs;

E) existence table means, connected to said data object control structure, and containing an indication, set by said CREATE means, for determining whether said stored data object may be used from said virtual storage cache by a retrieving one of said user programs; and F) search means, responsive to a RETRIEVE request by said retrieving one of said user programs, for retrieving said stored data object from said virtual storage cache, said search means accessing said associated search order definition means to determine from where in the data set search order associated with said retrieving one of said user programs said stored data object was retrieved, and accessing said existence table means to determine whether said stored data object may be used by said retrieving one of said user programs.

2. The facility of claim 1 in which said existence table means comprises a table linked to a block containing said searched for minor name, said table having at least one entry, said entry being associated by an ordering with a single major name, said entry containing said indication, said indication having a first entry containing said indication, said indication having a first value to indicate that said searched for minor name does not identify any data object within the data set uniquely identified by said single major name, and having a second value to indicate that said searched for minor name may identify a relevant data object within the data set uniquely identified by said single major name, said CREATE means setting said indication to said first value for each entry having an associated single major name occurring, in said ordered list of entries linked to said storing one of said user programs, prior to the major name identifying the associated data set from which said stored data object was obtained, said search means determining said stored data object to be usable by said retrieving one of said user programs when each entry having said associated single major name occurring, in said ordered list of entries linked to said retrieving one of said user programs, prior to the major name identifying the associated data set from which said stored data object was obtained has said first value.

3. The facility of claim 2 further comprising:

A) DEFINE CLASS means, responsive to a DEFINE CLASS request by a third one of said user programs, for separating cached data objects and control blocks associated with one of said classes of data objects from cached data objects and control blocks associated with others of said classes of data objects and associating an access token with said separated class;

B) PURGE means, responsive to a PURGE request by a data damage detecting function apart from any one of said user programs, for purging all of said separated cached data objects and control blocks associated with said one of said classes of data, and invalidating the associated access token;

C) invalidity determination means, invoked by said search means, for determining whether the RETRIEVE request is for said separated class whose associated access token was invalidated by said PURGE means, and returning a "failed" indication to said search means when the associated access token was so invalidated.

4. The facility of claim 3 in which said virtual storage cache comprises a first data space containing only control blocks associated with said one of said classes of cached data objects, and a second data space containing only data objects associated with said one of said classes of cached data objects.

5. The facility of claim 4 in which said access token comprises a data space access list entry (ALET).

6. The facility of claim 5, further comprising means for trimming from said virtual storage cache infrequently used data objects.

7. In a central electronic complex comprising system resources, user programs, and an operating system for managing said system resources, a programmed method for managing named data objects in a virtual lookaside facility (VLF) comprising the steps of:

A) constructing a first data set search order by an IDENTIFY function, on behalf of one of the user programs, said first data set search order comprising an ordered list of major names, each major name in the ordered list uniquely identifying one of a sequence of data sets, each data set containing associated data objects each having a minor name, said first data set search order indicating an order of searching for a data object within said sequence of data sets on request by said one of the user programs such that a search commences with a first data set in said sequence of data sets, and terminates when the data set containing said data object is identified or when all of said sequence of data sets has been searched;

B) in response to a CREATE request by said one of the user programs, placing in virtual storage managed by said VLF a copy of a particular data object having a particular minor name, said particular data object having been obtained by said one of the user programs from a containing data set having an associated major name;

C) comparing the associated major name with said ordered list of major names and setting an indicator in an existence table that said particular minor name does not identify any data object in any data set identified by any major name occurring earlier in said first data set search order than the associated major name;

D) in response to a RETRIEVE request for the particular minor name by a second one of the user programs, said second one of the user programs having a second data set search order: providing a best data object, having the particular minor name, from said virtual storage managed by said VLF, said best data object being from a first known containing data set in said second data set search order, and further providing to said second one of the user programs a return indicator indicating either (a) that said best data object is a requested data object when said indicator indicates that the particular minor name does not identify any data object in any data set earlier in said second data set search order than the first known containing data set, or (b) that said best data object may possibly not be the requested data object when said indicator indicates that the particular minor name may possibly identify any data object in any data set earlier in said second data set search order than the first known containing data set; and returning a "not available" indicator when no such best data object, having the particular minor name, exists in said virtual storage, managed by said VLF, from any containing data set in said second data set search order.

8. The method of claim 7, further comprising, after said steps of placing in virtual storage and storing existence information, the step of invalidating said copy of said particular data object if said particular data object is changed after said copy is placed in said virtual storage managed by said VLF.

9. The method of claim 8, further comprising the step of trimming older objects from said virtual storage managed by said VLF when an available amount of said virtual storage is less than an installation limit.

* * * * *